US008948925B2

(12) United States Patent
Katoh et al.

(10) Patent No.: US 8,948,925 B2
(45) Date of Patent: Feb. 3, 2015

(54) VIDEO PROCESSING DEVICE FOR DETERMINING VIDEO INFORMATION STATUS USING ANALYSIS TARGET SPECIFYING UNIT

(75) Inventors: Tetsuhiro Katoh, Kobe (JP); Kimitaka Murashita, Kobe (JP)

(73) Assignees: Fujitsu Ten Limited, Hyogo (JP); Fujitsu Limited, Kanagawa (JP)

( * ) Notice: Subject to any disclaimer, the term of this patent is extended or adjusted under 35 U.S.C. 154(b) by 327 days.

(21) Appl. No.: 13/334,878

(22) Filed: Dec. 22, 2011

(65) Prior Publication Data

US 2012/0162407 A1   Jun. 28, 2012

(30) Foreign Application Priority Data

Dec. 28, 2010   (JP) .................................. 2010-292711

(51) Int. Cl.
*G06F 17/00* (2006.01)
(52) U.S. Cl.
USPC .............................................. 701/1; 348/169
(58) Field of Classification Search
CPC ................... B60R 2300/305; B60R 2300/105; B60R 1/00; H04N 21/42646; G06K 9/00791
See application file for complete search history.

(56) References Cited

U.S. PATENT DOCUMENTS

| | | | | |
|---|---|---|---|---|
| 5,475,494 A * | 12/1995 | Nishida et al. | ................ | 356/4.01 |
| 7,038,577 B2 * | 5/2006 | Pawlicki et al. | ............... | 340/435 |
| 7,542,835 B2 * | 6/2009 | Takahama et al. | ............... | 701/45 |
| 7,774,113 B2 * | 8/2010 | Oyaide | ............................ | 701/36 |
| 8,115,816 B2 * | 2/2012 | Ogawa | ...................... | 348/207.99 |
| 8,355,582 B2 * | 1/2013 | Sagawa | .......................... | 382/199 |
| 2003/0099377 A1 * | 5/2003 | Hanawa | ........................ | 382/104 |
| 2007/0013497 A1 | 1/2007 | Watanabe | | |
| 2008/0012938 A1 * | 1/2008 | Kubota et al. | ................. | 348/118 |
| 2010/0215218 A1 | 8/2010 | Takahashi | | |
| 2011/0044506 A1 * | 2/2011 | Chen | ............................. | 382/103 |
| 2012/0026326 A1 * | 2/2012 | Itoh et al. | ...................... | 348/143 |

FOREIGN PATENT DOCUMENTS

| | | |
|---|---|---|
| JP | A-10-032908 | 2/1998 |
| JP | A-2000-207563 | 7/2000 |
| JP | A-2003-168118 | 6/2003 |
| JP | A-2003-255430 | 9/2003 |
| JP | A-2006-229341 | 8/2006 |
| JP | A-2007-1333 | 1/2007 |
| JP | A-2010-141486 | 6/2010 |
| WO | WO 2009/057410 A1 | 5/2009 |

OTHER PUBLICATIONS

Feb. 18, 2014 Office Action issued in Japanese Patent Application No. 2010-292711 (with translation).
May 20, 2014 Notice of Reason for Rejection issued in Japanese Patent Application No. 2010-292711 (with English translation).

* cited by examiner

*Primary Examiner* — Sath V Perungavoor
*Assistant Examiner* — Janese Duley
(74) *Attorney, Agent, or Firm* — Oliff PLC

(57) ABSTRACT

To provide a technology of determining a status of image information based on the image information of images captured by an image capturing device. A video processing method to process video information of an image capturing device mounted on a moving body, includes detecting an analysis target from video information of images captured by the image capturing device, determining a status of the video information on the basis of information on the analysis target and outputting a result of the determination.

7 Claims, 14 Drawing Sheets

UNABLE TO DETECT.

POSSIBILITY IS DEFICIENCY OF LIGHT QUANTITY.

VIDEO PROCESSING DEVICE FOR DETERMINING VIDEO INFORMATION STATUS USING ANALYSIS TARGET SPECIFYING UNIT

CROSS-REFERENCE TO RELATED APPLICATION

This application is based upon and claims the benefit of priority of the prior Japanese Patent Application No. 2010-292711, filed on Dec. 28, 2010, the entire contents of which are incorporated herein by reference.

FIELD

The present invention relates to a technology of processing video of an image capturing device mounted on a moving body.

BACKGROUND

There is a technology of supporting a visual check of a driver by executing a predetermined process with respect to images captured by an on-board camera in vehicle.
[Patent document 1] Japanese Patent Application Laid-Open Publication No. 2007-001333
[Patent document 2] Japanese Patent Application Laid-Open Publication No. 2000-207563

SUMMARY

A problem of a system using only an on-board camera as a sensor has, however, such a problem that the on-board camera does not sufficiently function as a support for the visual check, depending on an external environment and a state of this on-board camera. For instance, in the case of utilizing only a general type of camera based on visible light as the sensor in a totally dark road, even if a target object to which an attention is to be paid exists in the periphery of a self-vehicle, the object does not appear to be the target object due to the total darkness, and a driver misjudges that there is none of the target object to which the attention is to be paid as the case may be.

Further, if a dirt etc is attached to the on-board camera, it is not feasible to provide a proper support, resulting in a possibility that the driver makes the erroneous-judgment.

A conventional solution is that the information is collected by other sensors, from an illumination sensor on down, which recognize an external environment and a status of the camera, thereby determining whether the system normally operates. This scheme, however, involves using the sensors other than the on-board camera, therefore, the device configuration may become complicated.

Such being the case, it is an aspect of an embodiment of the present invention to provide a technology of determining the status of the video information on the basis of the video information of the images captured by the image capturing device.

A video processing device according to the aspect of the embodiment is a device to process video information of an image capturing device mounted on a moving body, including: an analysis target detection unit to detect an analysis target from video information of images captured by the image capturing device; a status determining unit to determine a status of the video information on the basis of information on the analysis target detected by the analysis target detection unit; and an output control unit to output a result of the determination.

Moreover, a video processing method according to an aspect of the embodiment is a method to process video information of an image capturing device mounted on a moving body, by which a computer executes: detecting an analysis target from video information of images captured by the image capturing device; determining a status of the video information on the basis of information on the analysis target; and outputting a result of the determination.

Further, an aspect of the embodiment may be a video processing program for making a computer execute the video processing method. Still further, this video processing program may be recorded on a non-transitory computer-readable recording medium. The computer is made to read and execute the video processing program on this recording medium, thereby providing the function thereof.

Herein, the non-transitory computer-readable recording medium connotes a recording medium capable of retaining information such as data and programs electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the recording mediums fixed within the computer.

According to an aspect of the embodiment, it is feasible to provide the technology of determining the status of the video information on the basis of the video information of the images captured by the image capturing device.

DETAILED DESCRIPTION

A mode for carrying out the present invention will hereinafter be described with reference to the drawings. Configurations in the following embodiments are exemplifications, and the present invention is not limited to the configurations of the embodiments.

First Embodiment

Figure 1:
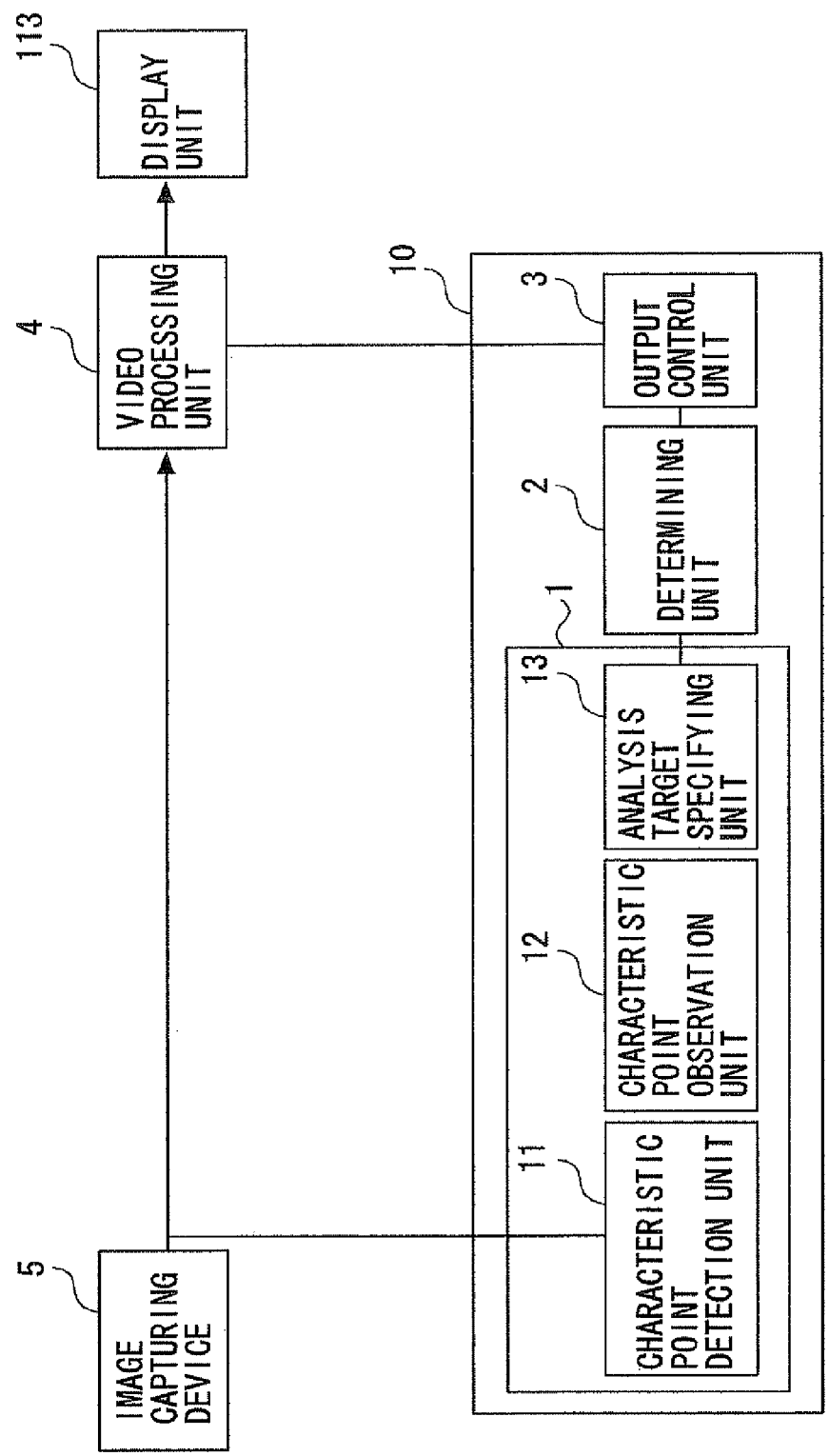
FIG. 1 is a block diagram of functions of a video processing device according to the present invention.

FIG. 1 is a schematic diagram of a configuration of a video processing apparatus 10 in the first embodiment. As depicted in FIG. 1, the video processing device 10 includes an analysis target detection unit 1, a status determining unit 2 and an output control unit 3, in which video information of images captured by an image capturing device 5 is processed and displayed on a display device 113 via a video processing unit 4. With this configuration, the video processing device 10 supports a visual check by a driver in a way that displays a blind spot and emphatically displays an approaching object such as a two wheeler which overtakes from the blind spot.

Further, the video processing device 10 of the first embodiment determines a status of the video information of the images captured by the image capturing device 5, and outputs a result of this determination. Through this operation, for example, an alarm is issued if unable to support properly in such a case that the image capturing device 5 gets into a fault or gets disabled from capturing the images due to excessive darkness, thereby enhancing reliability.

The image capturing device 5 is a camera mounted on a moving body (which is a vehicle in the first embodiment), captures the images in the periphery of the moving body and inputs the video information to the video processing unit 4, the analysis target detection unit 1, etc.

The video processing unit 4 executes a process such as converting the video information (image data) inputted from the image capturing device 5 and the video processing device 10 into predetermined video signals for displaying the video information on the display device 113.

The analysis target detection unit 1 detects analysis targets such as noises and characteristic points from the video information of the images captured by the image capturing device 5.

The analysis target detection unit 1 in the first embodiment includes a characteristic point (analysis target) detection unit 11, a characteristic point (analysis target) observation unit 12 and an analysis target specifying unit 13.

The characteristic point detection unit 11 detects the characteristic points from the video information inputted from the image capturing device 5. The characteristic point observation unit 12 calculates a fluctuation in position between frames in which the characteristic points become different (moving). The analysis target specifying unit 13 specifies a moving direction of the analysis target from the positional fluctuation calculated by the characteristic point observation unit 12.

The status determining unit 2 detects, based on the information on the analysis target detected by the analysis target detection unit 1, an object which approaches, e.g., a self-vehicle. The output control unit 3 generates the video information representing the on-video position etc of the object that serves to emphatically display the approaching object to the self-vehicle, which is detected by the status determining unit 2 and transmits the video information to the video processing unit 4, and the video processing unit 4 emphatically displays the position of the object on the image captured by the image capturing device 5. The video information is displayed, thus contributing to the support of the visual check by the driver. Note that the output of the output control unit 3 may be, without being limited to the display output to the display device 113, a voice output, transmission to another computer, writing to a storage medium and a combination thereof.

Figure 6:
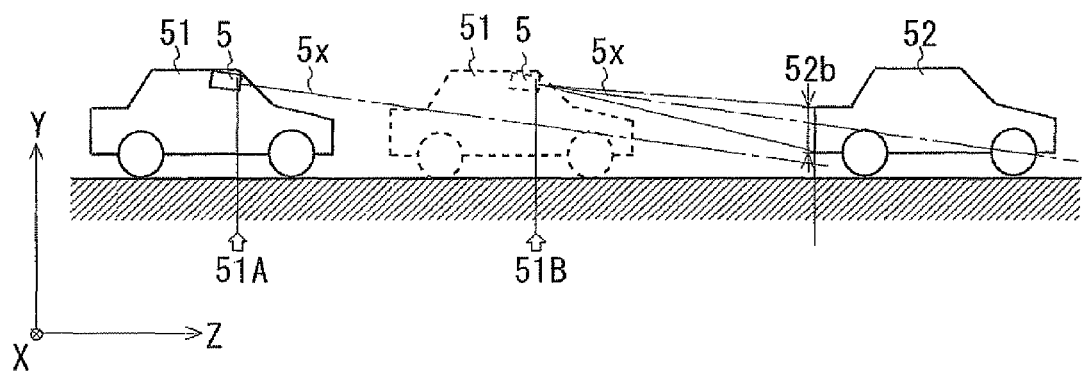
FIG. 6 is an explanatory diagram of a process of detecting an approaching object.

FIGS. 6-10 are explanatory views of a process for detecting the approaching object. In FIG. 6, the image capturing device 5 is installed at an internal side of a roof of the self-vehicle 51 in a way that directs an optical axis 5x of an image capturing lens toward the front of a self-vehicle 51.

Figure 7:
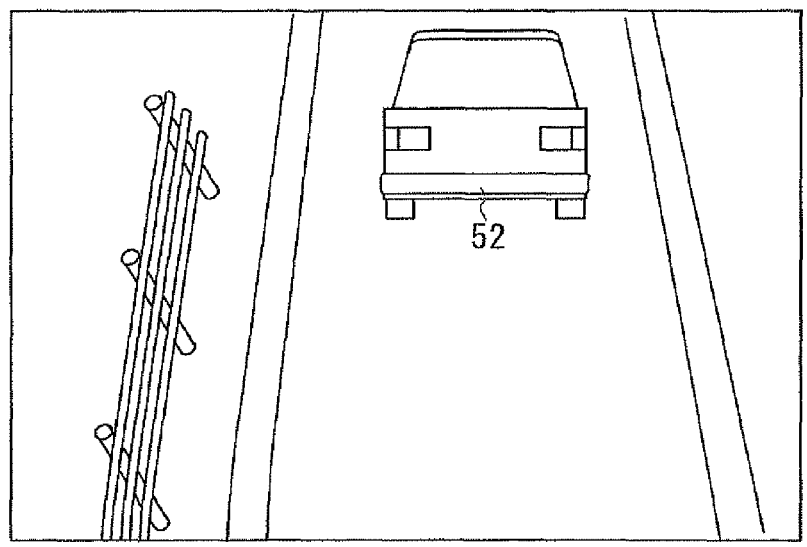
FIG. 7 is a schematic view illustrating an example in which an image capturing device equipped in a self-vehicle captures an image of a forward vehicle.

FIG. 7 illustrates an example of the video information of the image captured from a position 51A by the image capturing device 5 with which the self-vehicle 51 is equipped and also an example of capturing a vehicle 52 existing forward within the video information.

Figure 8:
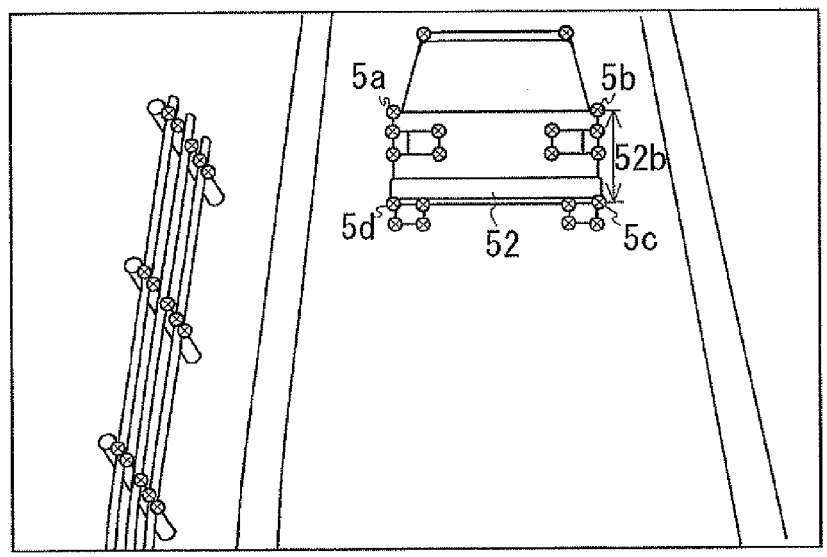
FIG. 8 is a schematic view depicting characteristic points extracted from video information in FIG. 7.

The characteristic point detection unit 11 of the analysis target detection unit 1 extracts the characteristic points as the analysis target by image-processing the video information. Note that a characteristic point extraction algorithm may involve adopting arbitrary algorithms such as Harris Operator, Moravec corner detection algorithm and SUSAN Operator. FIG. 8 schematically depicts the characteristic points extracted from the video information in FIG. 7. The characteristic point detection unit 11 may be satisfactory to obtain coordinates of the respective characteristic points but has no necessity for displaying the characteristic points, however, for the explanatory's sake in FIG. 8, the characteristic points are each schematically indicated by a mark, i.e., encircled "x".

Figure 9:
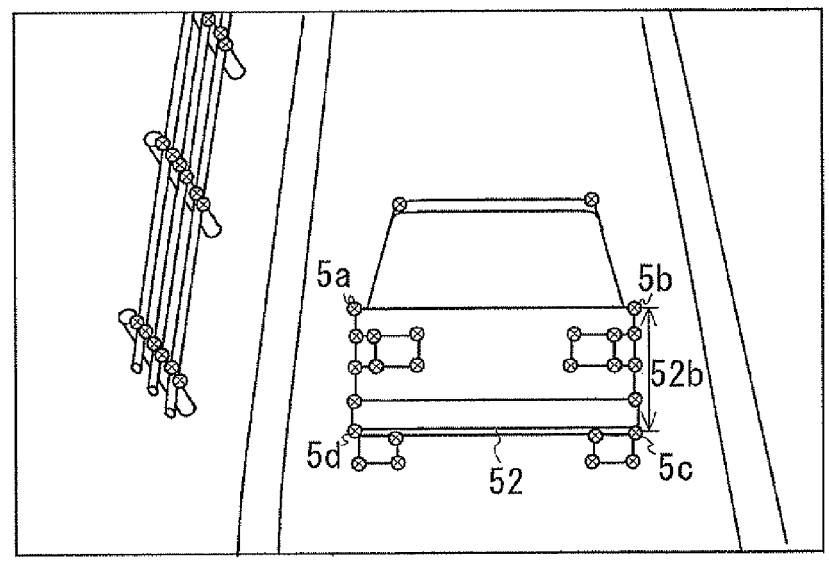
FIG. 9 is a view illustrating an example of the video information obtained by capturing the image of the forward vehicle from a position 51B.
Figure 10:
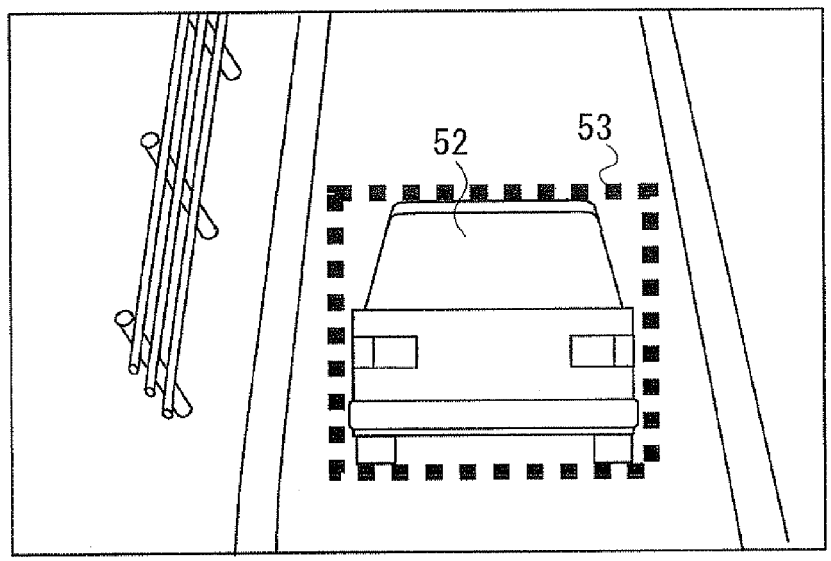
FIG. 10 is a view depicting an example of emphatically displaying the forward vehicle defined as the approaching object by circumscribing this vehicle with a rectangle.

Then, FIG. 9 illustrates an example of the video information of the image captured from a position 51B relative to the forward vehicle 52 by the image capturing device 5 equipped in the self-vehicle 51. Thus, when approaching the forward vehicle 52, the positions of the characteristic points on the forward vehicle change. The characteristic point observation unit 12 obtains the changed positions of the respective characteristic points, and the analysis target specifying unit 13 detects the approaching object on the basis of the changes of the positions of the characteristic points. To be specific, characteristic points $5a$-$5d$ move downward of the image in FIG. 9 as compared with FIG. 8, and a dimension $52b$ between, e.g., the characteristic points $5b$-$5c$ among the characteristic points 5a-5d elongates, whereby the analysis target specifying unit 13 detects that the object is an approaching object. The output control unit 3 synthesizes the video information with a rectangle circumscribing the characteristic points of this approaching object, thereby emphatically displaying the approaching object. FIG. 10 depicts an example of emphatically displaying the forward vehicle 52 as the approaching object in a manner that circumscribes the vehicle 52 with a rectangle 53.

It may be noted that the first embodiment has exemplified the example of using the characteristic points by way of the analysis target, however, the element(s) of the analysis target may be, without being limited to these characteristic points, respective line segments of a contour extracted from the video information and a surface circumscribed by these line segments.

Further, the status determining unit 2 determines a status of the video information on the basis of the information of the analysis target detected by the analysis target detection unit 1. The output control unit 3 outputs a result of the determination made by this status determining unit 2. Namely, the output control unit 3 reports that the visual support for the driver is disabled from being performed due to a decline of availability of the video information as in the case of whether illuminance drops down as the image capturing device 5 gets difficult to capture the image and whether the image capturing device 5 gets into the fault.

The video processing device 10 in the first embodiment illustrated in FIG. 1 realizes the respective functions as the units 1-4 by dedicated pieces of hardware. Herein, the hardware may include circuits, e.g., FPGA (Field Programmable Gate Array), ASIC (Application Specific Integrated Circuit) and LSI (Large Scale Integration). Moreover, the hardware may include basic circuits such as IC (Integrated Circuit), a gate array, a logical circuit, a signal processing circuit and an analogue circuit.

The logical circuit is exemplified by, e.g., an AND circuit (circuit which performs logical conjunction), an OR circuit (circuit which performs logical addition), a NOT circuit (inverter circuit), a NAND circuit (circuit which performs non-conjunction), a NOR circuit (circuit which performs non-disjunction), a flip-flop circuit and a counter circuit. The signal processing circuit may include circuits which execute addition, multiplication, division, inversion,
a SOP (sum of production) operation, differentiation and integration with respect to the signal values. The analogue circuit may include circuits which execute, e.g., amplification, addition, multiplication, differentiation and integration with respect to the signal values.

Note that the video processing device 10 is a computer including a general-purpose processor (CPU (Central Processing Unit)) and may take a configuration of realizing the functions as the respective units 1-4 by the CPU which executes the processes according to software (video processing program).

<Video Processing Method>

Figure 2:
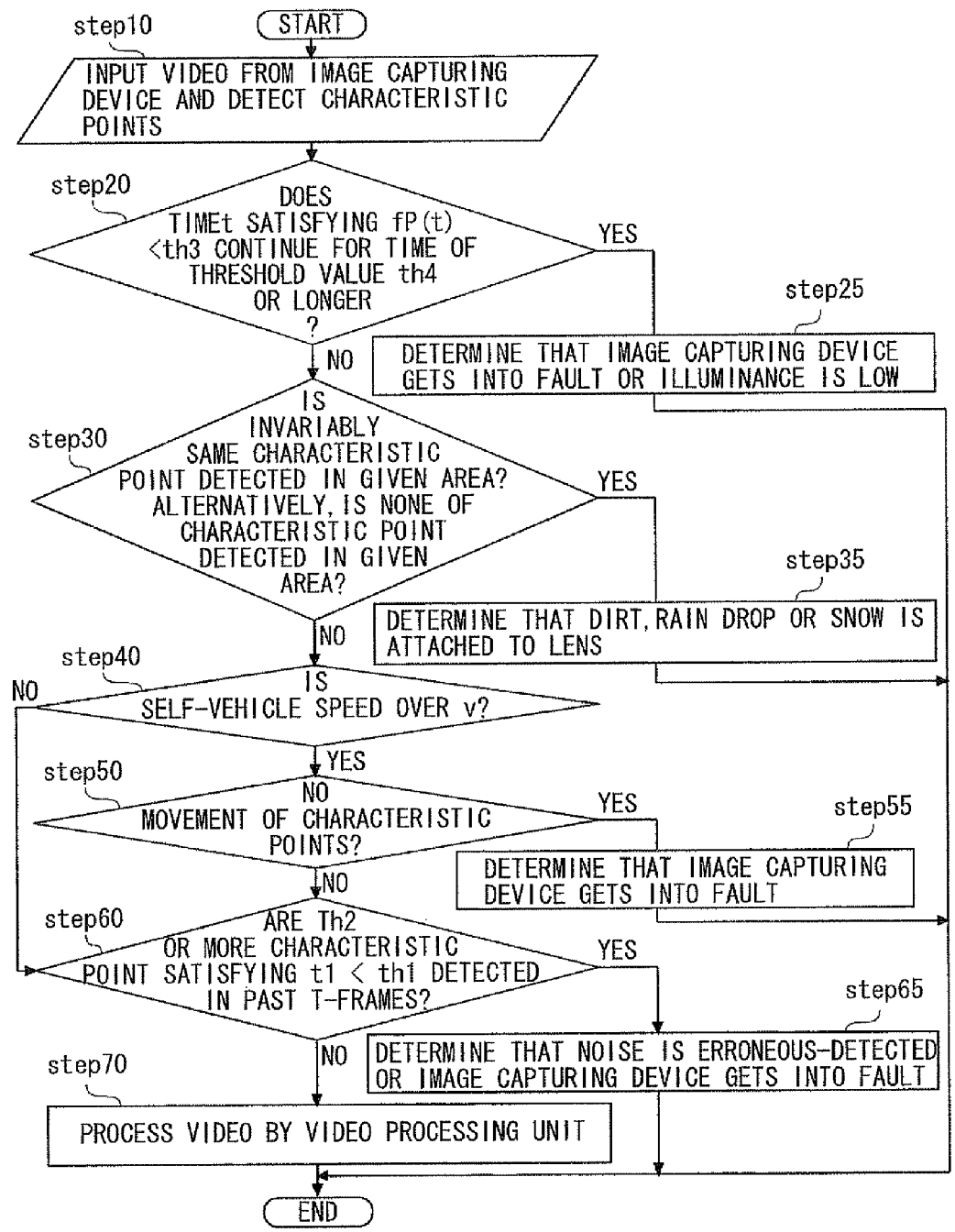
FIG. 2 is an explanatory diagram of a video processing method according to the present invention.

FIG. 2 is an explanatory diagram of a video processing method executed by the video processing device 10 having the configuration described above.

When an ignition key of the vehicle is turned to an ON position or an ACC position and when thus supplied with electric power, at first, the image capturing device 5 starts capturing the image, and the analysis target detection unit 1 receives the video information and detects the analysis target, i.e., obtains the characteristic points in the first embodiment (step 10). The Harris operator is known as a characteristic point detection method, however, the detection method is not limited to the Harris operator. For example, a contour extraction method is also available.

Next, the characteristic point observation unit 12 counts the number of the characteristic points detected by the characteristic point detection unit 11 and sets this characteristic point count as fp(t), and the analysis target specifying unit 13 sets, as t, a period of time for which the characteristic point count fp(t) is smaller than a predetermined threshold value th3 and determines whether the time t continues for a predetermined threshold value th4 or longer (step 20). Herein, the threshold value "th3" ranges from "1" to "10", and "th4" ranges from, e.g., 5 frames to 20 frames. Namely, as illustrated in FIG. 8, if a status of the characteristic points exceeding "10" continues for the time equivalent to 20 frames or more, the video information is "normal".

Figure 11:
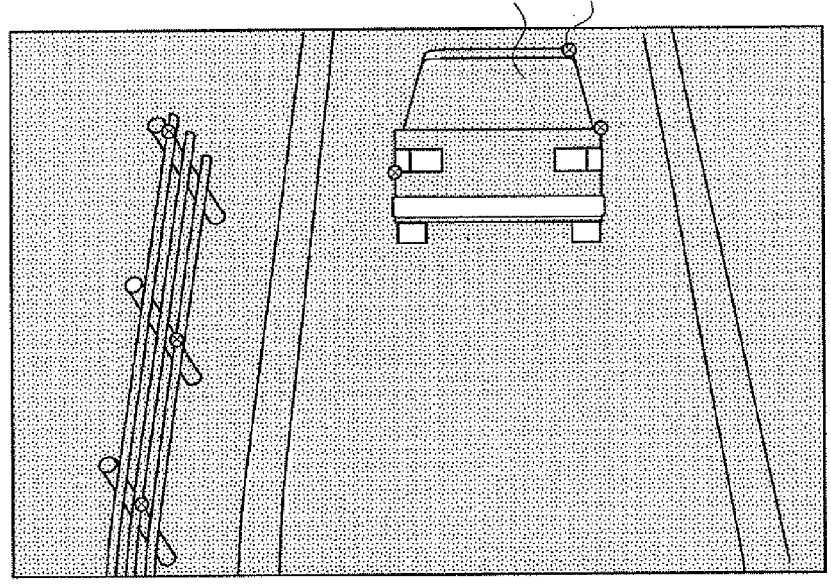
FIG. 11 is a view illustrating a case in which frames each having characteristic points less than several points continue.
Figure 12:
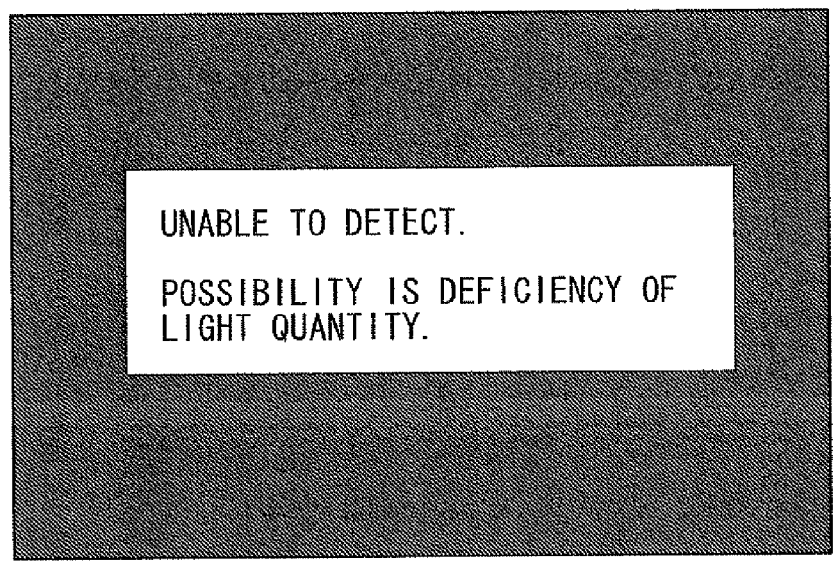
FIG. 12 is a diagram illustrating an example of outputting a message purporting that a support function can not be provided.

On the other hand, if a condition such as "fp (t)<th3, t≥th4" is satisfied, i.e., as depicted in FIG. 11, if there are consecutive 20 or more frames each having the characteristic point count being less than the threshold value "th3", the status determining unit 2 determines that the image capturing device (camera) 5 gets into the fault or the illuminance is low (step 25), and the output control unit 3 stops inputting the video information by giving notification to the video processing unit 4 and outputs a message to the driver such as displaying, on the display device 113, a message purporting that the support function for the visual check can not be provided as illustrated in FIG. 12 (step 25).

Figure 13:
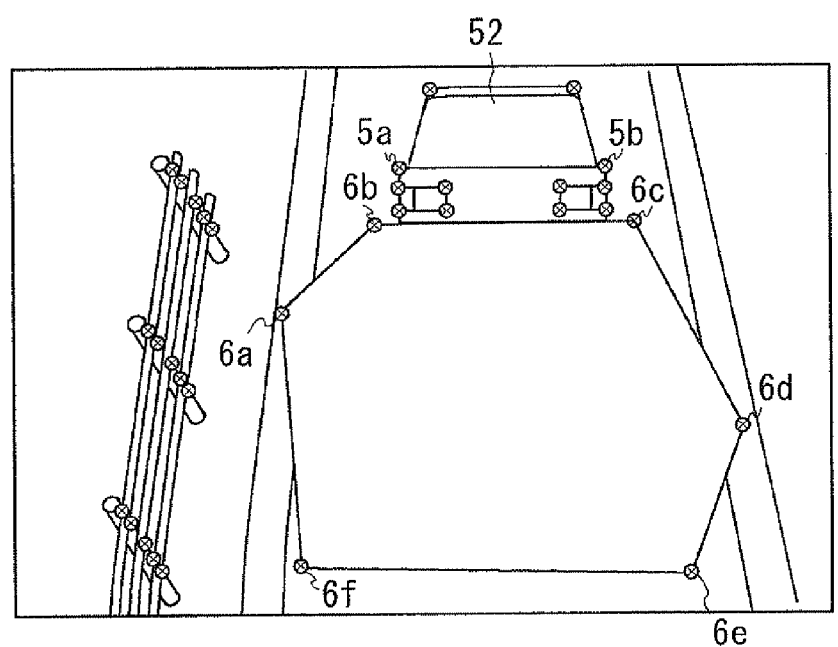
FIG. 13 is an explanatory view of a case of detecting the same characteristic points in a given area.
Figure 14:
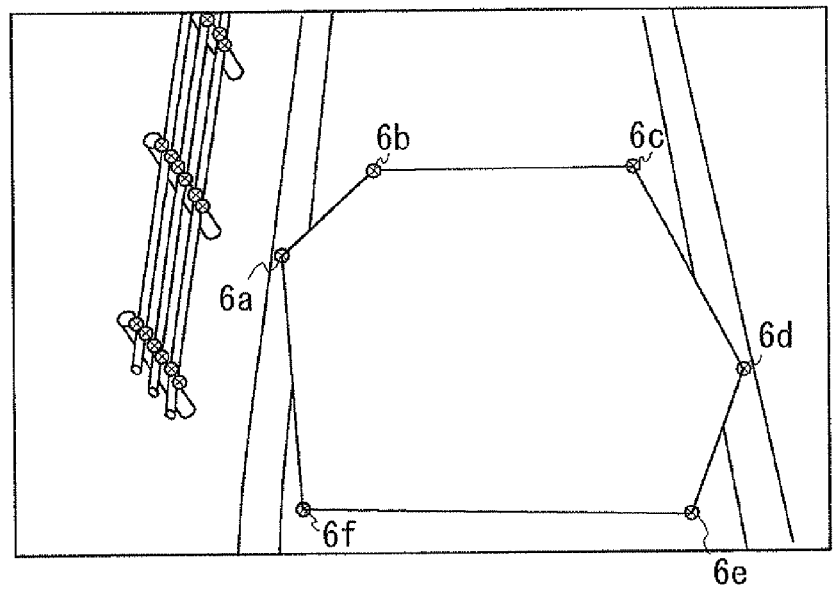
FIG. 14 is an explanatory view of the case of detecting the same characteristic points in the given area.
Figure 15:
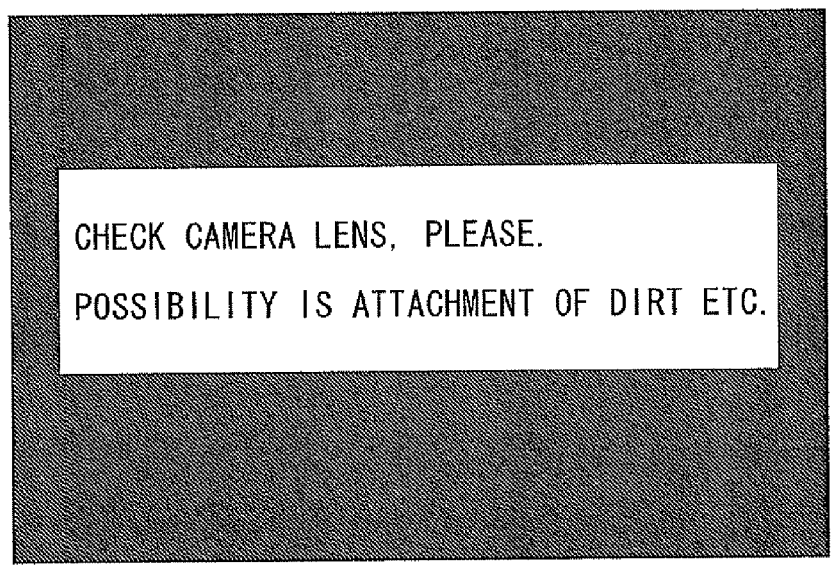
FIG. 15 is a diagram illustrating an example of outputting the message purporting that the support function can not be provided.

Next, the analysis target specifying unit 13 determines whether the same characteristic point is detected in a given area or none of the characteristic points are detected in the given area (step 30). To be specific, if there is an area with no change, it is determined that the lens of the image capturing device 5 is attached with a dirt or a substance such as a rain drop and snow. The analysis target specifying unit 13, when comparing, e.g., the frame illustrated in FIG. 13 with the frame depicted in FIG. 14 that is captured after a predetermined period of time since the frame illustrated in FIG. 13 has been captured, determines that characteristic points 6a-6f are detected in the same area and also determines that this area is attached with the dirt etc.

if this condition is satisfied, i.e., when determining that there is an image-capture-disabled area due to the attachment of a shield of the dirt etc, the output control unit 3 stops inputting the video information by giving the notification to the video processing unit 4 and outputs a message for the driver to display, on the display device 113, the message purporting that the support function for the visual check can not be provided as illustrated in FIG. 15 (step 35).

The characteristic point observation unit 12 receives speed information such as a vehicle speed pulse and the moving direction of the vehicle from an ECU (Electronic Control Unit) or a navigation system, and determines whether the self-vehicle speed is equal to or larger than a predetermined value v (step 40).

Figure 16:
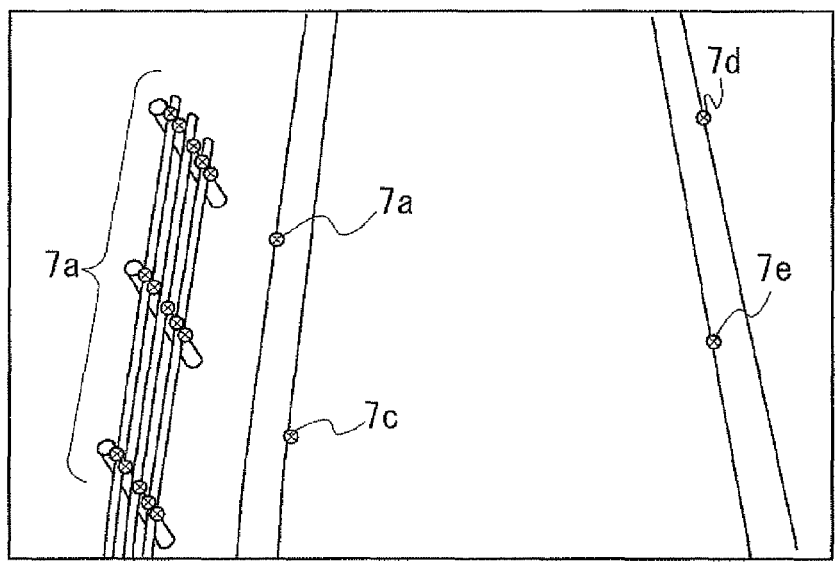
FIG. 16 is an explanatory view of a case where the characteristic points remain static for a predetermined period of time or longer.
Figure 17:
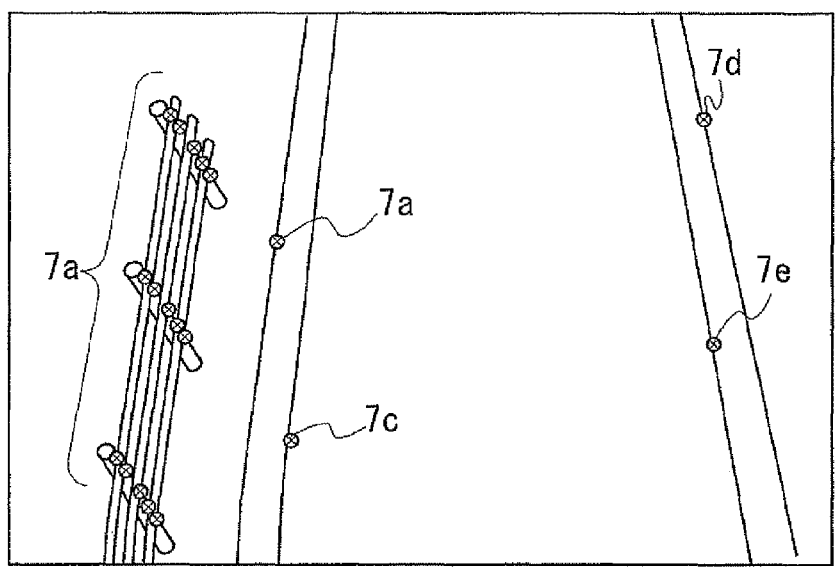
FIG. 17 is an explanatory view of the case where the characteristic points remain static for the predetermined period of time or longer.

If the self-vehicle speed is equal to or larger than the predetermined value v, the analysis target specifying unit 13 determines whether the characteristic points stop for a predetermined period of time or longer (step 50). Herein, the analysis target specifying unit 13 not only determines whether the characteristic points simply stop but also obtains the moving speed and the moving direction of the characteristic points, and may determine, if the movement of the automobile does not correspond to the moving speed and the moving direction of the characteristic points, that the image capturing device 5 gets into the fault. For instance, the frame depicted in FIG. 16 is compared with the frame illustrated in FIG. 17 that is captured after the predetermined period of time since the frame depicted in FIG. 16 has been captured, in which case characteristic points 7a-7f do not move, and therefore the analysis target specifying unit 13 determines that this is the fault of the image capturing device 5.

Figure 18:
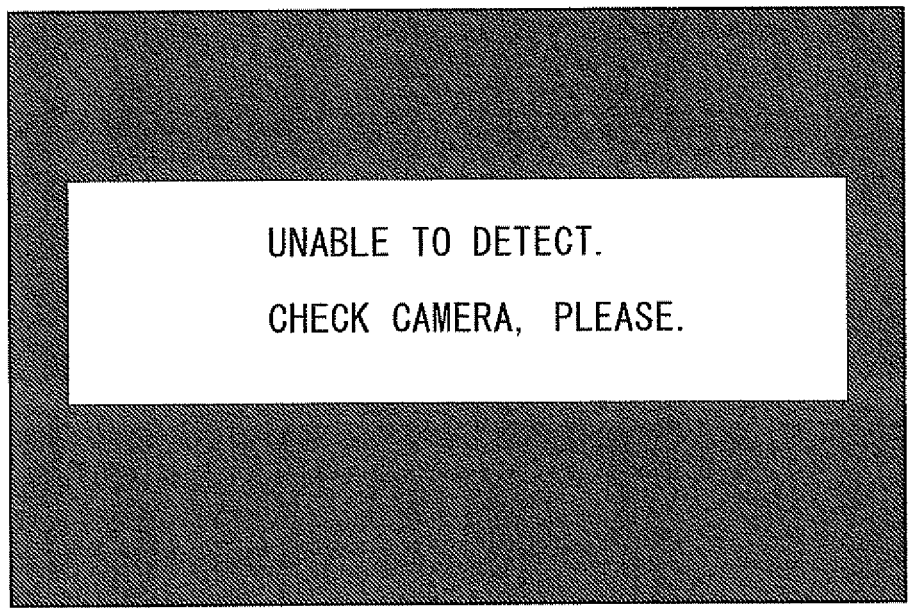
FIG. 18 is a diagram illustrating an example of outputting the message purporting that the support function can not be provided.

If this condition is satisfied, i.e., if the vehicle moves while the image remains static, it is determined that the image capturing device 5 is broken, and the output control unit 3 gives notification to the video processing unit 4 to stop the video process and outputs the message for the driver to display, on the display device 113, the message purporting that the support function for the visual check can not be provided as illustrated in FIG. 18 (step 55). Note that if the speed of the self-vehicle 51 is lower than the value v in step 40, the processing diverts to step 60 without making the determination in step 50. Thus, a mistake in detection is prevented by including the speed of the self-vehicle in the conditions for the determination, thereby enabling the fault of the camera to be detected.

It may be noted that the above-mentioned method can be realized without performing step 40. In this case, a possibility of erroneous-determination may be increased, but, if the erroneous-determination is prevented without the speed condition, such a method is considered that the camera is temporarily determined to have the fault if the characteristic points remain unmoved for a predetermined period of time or longer by further prolonging this predetermined period of time, or temporarily determining that the characteristic points remain unmoved for more than a predetermined period of time, and is finally determined to have the fault if this temporary determination continues more than the predetermined number of times.

Next, the characteristic point observation unit 12, when a certain characteristic point is detected, sets a continuation time of a continuation of the characteristic point thereof to "t1" and determines whether th2-pieces or more of the characteristic points, of which the continuation time t1 is smaller than the predetermined value th1, are detected in the past T-frames (step 60). Herein, the continuation time t1 is a length equivalent to, e.g., 1-10 frames, the characteristic point count th2 ranges from, e.g., 5 pieces to 20 pieces, and the frame count T ranges from e.g., 10 frames to 20 frames.

It is to be noted that the continuation of the characteristic point is defined as below. That is to say, though the characteristic points move along with the movement of the object, the direction and the range of the movement are limitative among the frames that continue at a frame rate as considerably fast as, e.g., 30 fps. In other words, as far as the points are the characteristic points of the identical object, it does not happen that there is a larger positional change than presumed between the frame of the last time and the frame of this time. Hence, the positions of the characteristic points are compared on a frame-to-frame basis, and, if the characteristic points of the frame of this time are detected within a predetermined range presumed from the characteristic points of the frame of the last time, it is determined that the characteristic points of the identical target continue. Thus, a state where the interframe consecutiveness of the characteristic points continues, is referred to as the continuation of the characteristic points.

Figure 19:
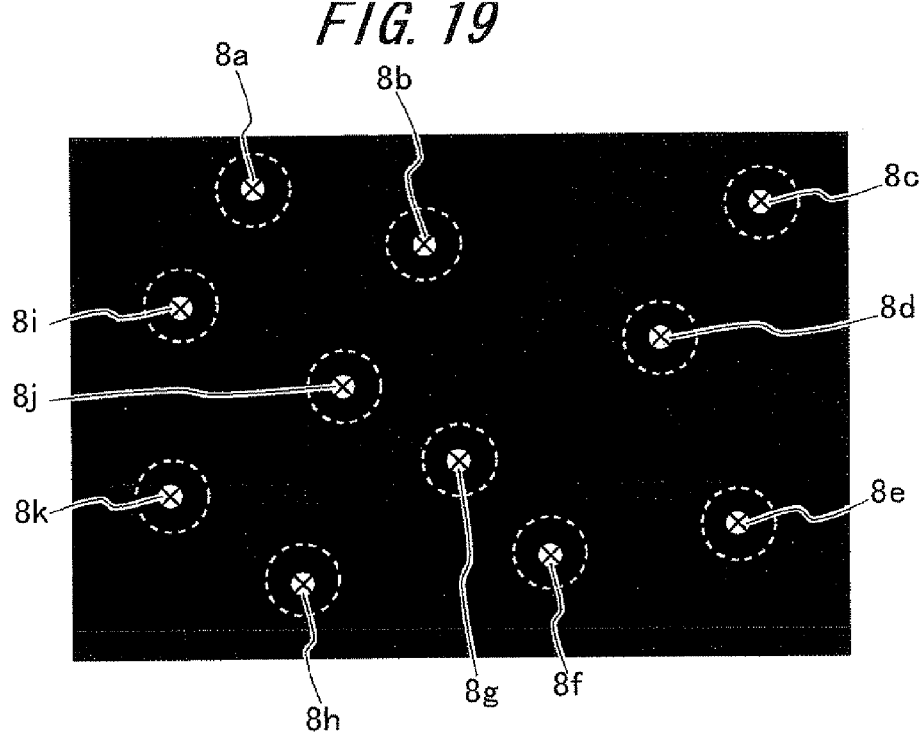
FIG. 19 is a view depicting an example of a short period of continuation time of the characteristic points.
Figure 20:
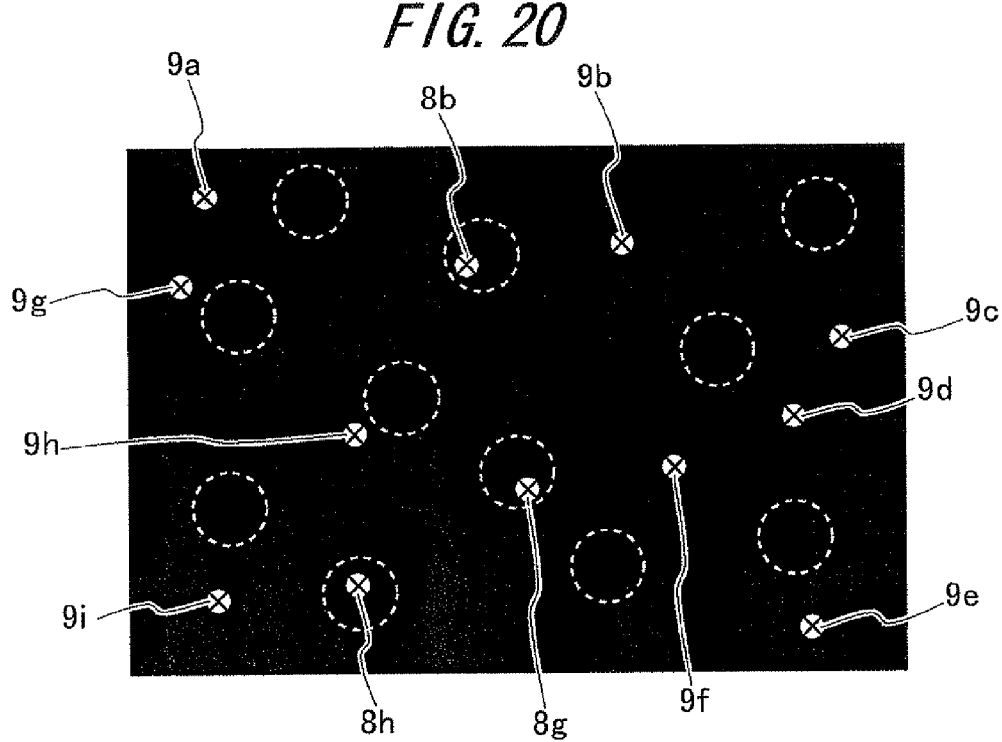
FIG. 20 is a view depicting an example of the short period of continuation time of the characteristic points.

For example, FIG. 19 is a diagram illustrating a frame in which characteristic points 8a-8k are detected, and FIG. 20 is a diagram illustrating a frame in which characteristic points 8b, 8g, 8h and 9a-9i are detected after a predetermined number of frames counted from the frame depicted in FIG. 19. Note that circles of broken lines in FIGS. 19 and 20 respectively represent predetermined ranges (which are, e.g., the circles each having a predetermined radius with the characteristic point being centered) where the movements of the characteristic points 8a-8k detected in the frame in FIG. 19 are presumed.

The analysis target specifying unit 13, in the case of comparing, e.g., the frame depicted in FIG. 19 with the frame depicted in FIG. 20, sets the predetermined ranges (which are the circles of the broken lines) where the movements of the characteristic points 8a-9k detected in the frame in FIG. 19 are presumed. Then, the analysis target specifying unit 13 determines, with respect to the characteristic points 8b, 8g, 8h detected in the predetermined ranges of the frame in FIG. 20, these characteristic points as the continuous characteristic points because of having the consecutiveness but counts the characteristic points 9a-9i as non-continuous characteristic points because of having no consecutiveness.

Figure 21:
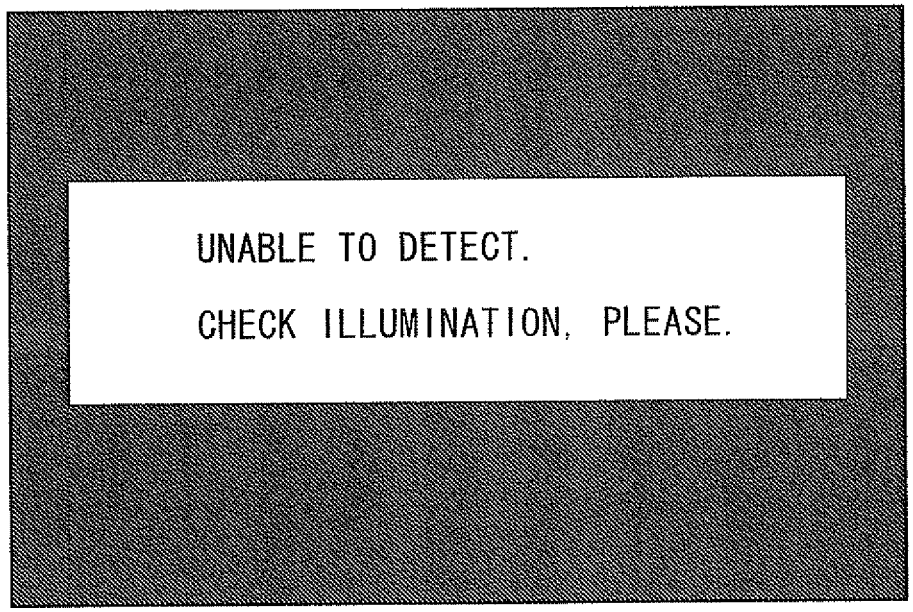
FIG. 21 is a diagram illustrating an example of outputting the message purporting that the support function can not be provided.

If this condition is satisfied, i.e., if there are a good number of characteristic points which disappear in an extremely short period of time, it is determined that the dark noises exhibiting the low illuminance are mis-detected as the characteristic points or that the image capturing device 5 is broken, and the output control unit 3 gives the notification to the video processing unit 4 to stop inputting the video information and outputs the message for the driver to display, on the display device 113, the message purporting that the support function for the visual check can not be provided as illustrated in FIG. 21 (step 65).

Then, whereas if the condition in step 60 is not satisfied, i.e., if the video information is available, the video processing device 10 processes the video information and supports the visual check as illustrated in FIG. 10 (step 70).

As discussed above, according to the first embodiment, the analysis target is obtained from the video information of the image capturing device 5 and compared with the predetermined condition, thereby enabling the availability of the video information to be easily determined. Further, in the first embodiment, the availability of the video information is determined in combination of the use of the analysis target detection unit 1 provided for detecting the approaching object to the self-vehicle by detecting the characteristic points, and hence the device configuration does not become complicated.

Second Embodiment

Figure 3:
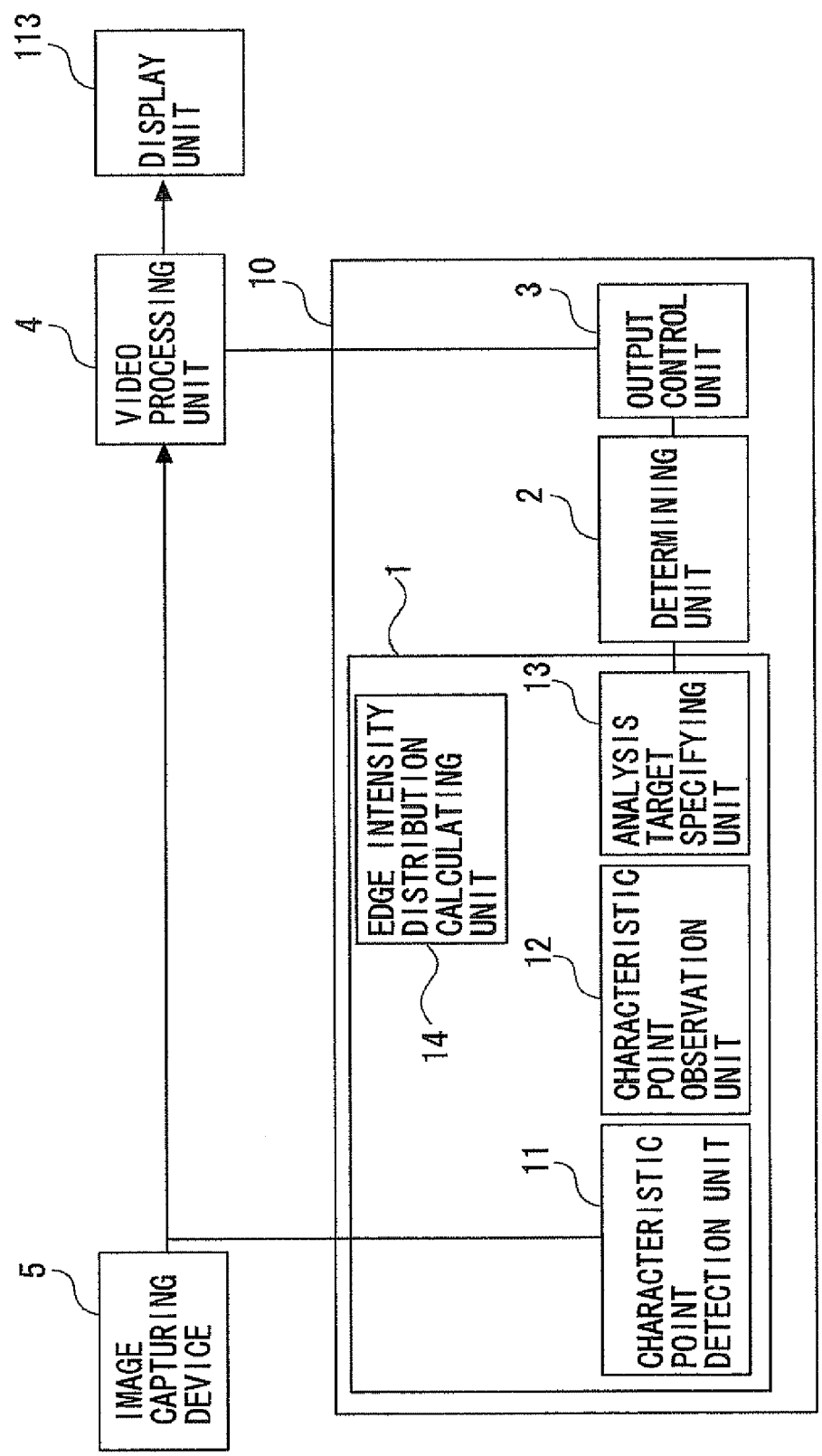
FIG. 3 is a block diagram of functions of the video processing device in a second embodiment.
Figure 4:
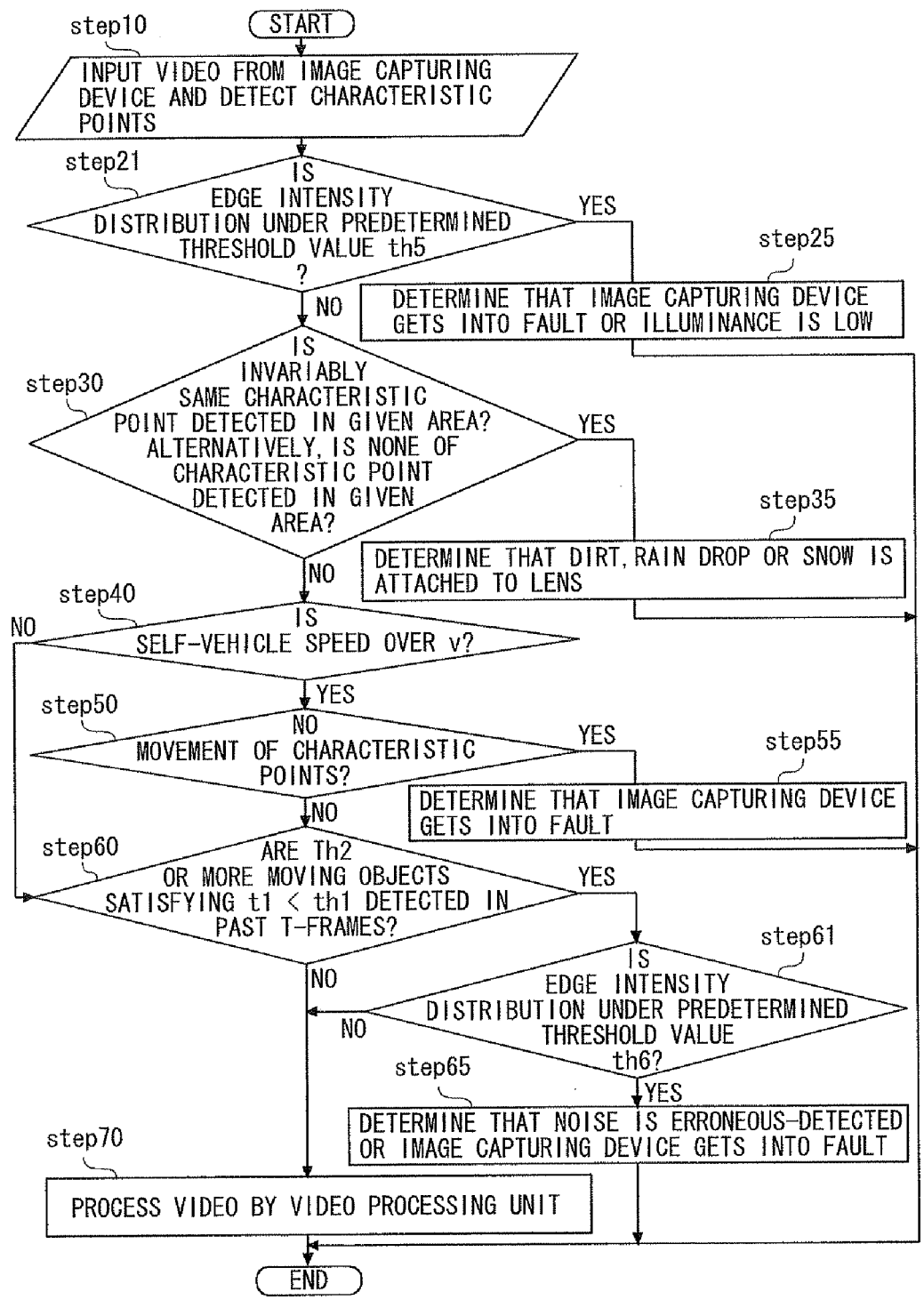
FIG. 4 is an explanatory diagram of the video processing method in the second embodiment.

FIG. 3 is a block diagram of functions of the video processing device in a second embodiment, and FIG. 4 is an explanatory diagram of the video processing method in the second embodiment. The second embodiment is different from the first embodiment discussed above in terms of such a configuration that the analysis target detection unit 1 includes an edge intensity distribution calculating unit 14 and the status determining unit 2 makes a determination by use of an edge intensity distribution in steps 21, 61 as to whether the illuminance is low, while other configurations are the same.

When the edge intensity distribution calculating unit 14 calculates the edge intensity distribution from the video information, the status determining unit 2 determines whether this edge intensity distribution is equal to or smaller than a threshold value th5 (step 21). Note that "the edge intensity distribution being equal to or smaller than the threshold value" implies that the edge intensity distribution is taken, and an output of an evaluation function (e.g., variance etc) thereof is equal to or smaller than the threshold value.

If this condition is satisfied, i.e., if disabled from capturing the image with a clear-cut contour because of the edge intensity distribution being low, the status determining unit 2 determines that the camera 5 gets into the fault or that the illuminance is low (step 25), and the output control unit 3 gives the notification to the video processing unit 4 to stop the video process and outputs the message for the driver to display, on the display device 113, the message purporting that the support function for the visual check can not be provided (step 25).

Moreover, if th2 or more pieces of characteristic points each satisfying a condition such as "continuation time t1<predetermined value" are detected in the past T frames in step 60, the edge intensity distribution calculating unit 14 calculates the edge intensity distribution from the video information, and the status determining unit 2 determines whether this edge intensity distribution is equal to or smaller than a threshold value th6 (step 61).

If this condition is satisfied, i.e., if the edge intensity distribution is low and the contour is not clear, the status determining unit 2 determines that the camera 5 gets into the fault or the illuminance is low (step 65). Whereas if the condition is not satisfied in step 61, i.e., if the decrease in luminance is allowable, the video processing unit 4 processes the video information and supports the visual check (step 70).

Incidentally, it is preferable that the threshold value th5 is set low (e.g., zero) in order to determine whether the video information indicates total darkness. Hence, the condition is set such as th5<th6.

As described above, in the second embodiment also, the analysis target is obtained from the video information of the image capturing device 5 and compared with the predetermined condition, thereby enabling the availability of the video information to be easily determined.

<System Architecture>

Figure 5:
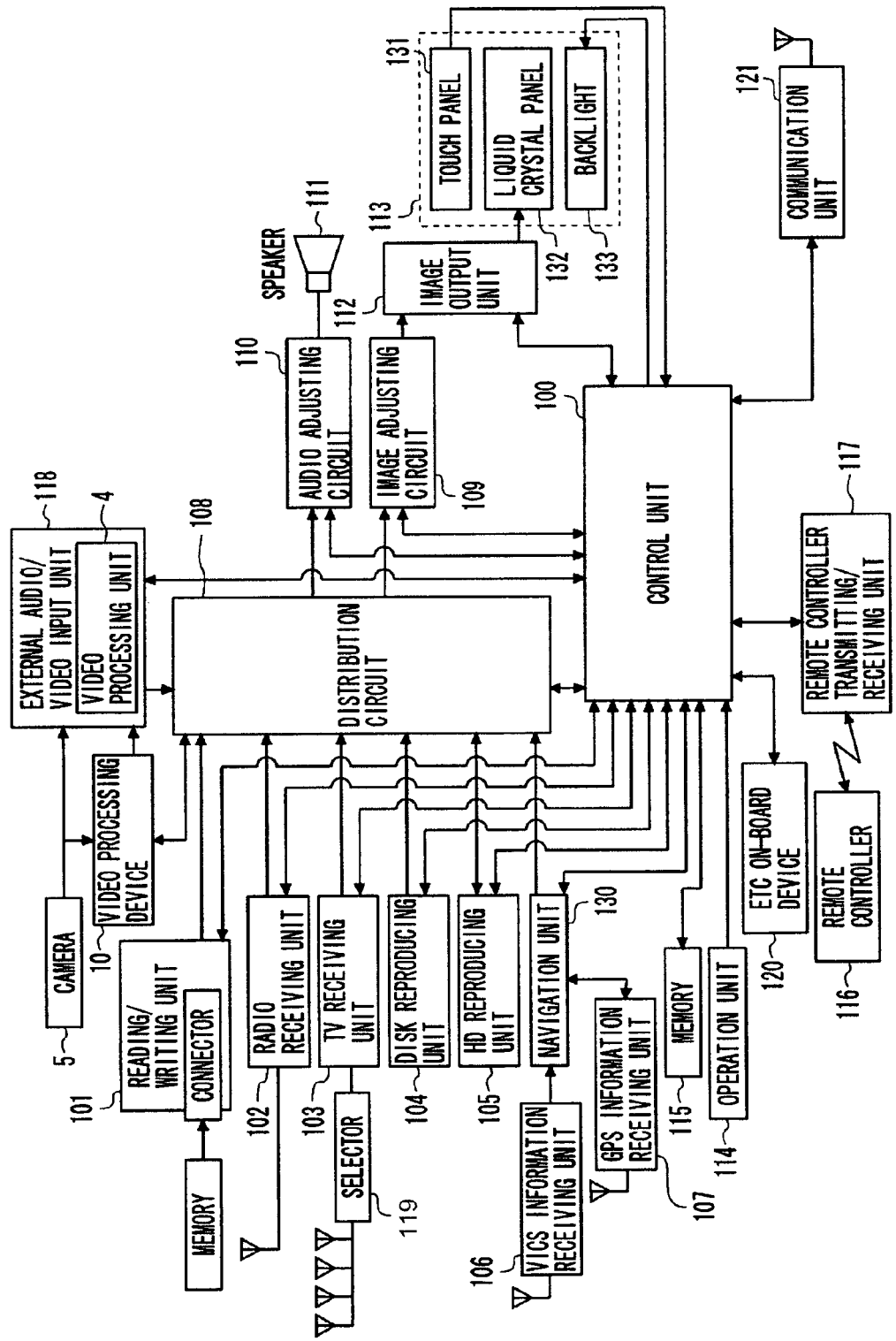
FIG. 5 is an explanatory diagram of a modified example of a block diagram depicting a configuration of an AVN integrated machine which adopts the video processing device according to the present invention.

FIG. 5 illustrates an on-board audio-visual navigation integrated machine (which will hereinafter be abbreviated to the AVN integrated machine) including the video processing device according to the present invention.

A numeral 100 designates a control unit which receives an input of signals from each of the units of the AVN integrated machine or from connected external equipment and an input of an operation instruction signal from each operation unit on the basis of an operation of the user, and controls in a generalized manner the respective units of the AVN integrated machine or the external equipment on the basis of these signals, the control unit 100 being built up by, e.g., a microcomputer (MC) and operating based on a program stored on a memory such as a ROM (Read Only Memory).

A numeral 101 denotes a reading/writing unit (including, i.e., a reading unit) for an external storage medium, which reads the information from the external storage medium connected to a connector and writes the information to the external storage medium. Note that the external storage medium involves using a memory card, a USB memory, etc.

A numeral 102 stands for a radio receiving unit which selectively receives broadcast waves having a specified frequency from within the broadcast waves received by an antenna and outputs voice signals of the broadcast by making demodulation, and has a configuration including a tuning circuit, a demodulating/decoding circuit, etc. A variety of operations of the radio receiving unit 102 such as an ON/OFF operation and selection (tuning) of a reception frequency are controlled by control signals given from the control unit 100.

A numeral 103 represents a television (TV) receiving unit which selectively receives the broadcast waves having the specified frequency from within the broadcast waves received through a selector 119 and outputs the voice signals and image signals of the broadcast by performing the demodulation, and has a configuration including a tuning circuit, a demodulating circuit (data acquiring unit), a frame management circuit, a decoding circuit, etc. A variety of operations of the TV receiving unit 103 such as the ON/OFF operation and the selection (tuning) of the reception frequency are controlled by the control signals given from the control unit 100.

A numeral 104 represents a disk reproducing unit which reads data stored on a disk by picking up (the signals) and outputs the voice signals and the image signals (in the case of, e.g., a DVD and a BD (Blu-ray Disc) based on the read data, and has a configuration including an optical pickup (data acquiring unit), a pickup/disk drive mechanism, a control circuit of the pickup/disk drive mechanism, a frame management circuit, a decoding circuit, etc. Then, a variety of operations of the disk reproducing unit 104 such as the ON/OFF operation and specifying a read position are controlled by the control signals given from the control unit 100.

A numeral 105 designates a HD reproducing unit which reads and outputs a desired category of data from various categories of data such as music data of an MP3 file etc, the image data of a JPEG file etc, moving picture data of MPEG4 etc, map data for the navigation and so on, which are stored on a hard disk (HD) defined as a magnetic recording medium, and has a configuration including a HD drive, the data acquiring circuit which reads the data from the HD drive, the frame management circuit, the decoding circuit, etc. Then, a variety of operations of the HD reproducing unit 105 such as the ON/OFF operation and the selection of the data to be read are controlled by the control signals given from the control unit 100.

A numeral 130 stands for a navigation unit which performs a route guidance to a destination by displaying a position of the self-vehicle and a route to the destination on the map, conducting a voice guidance for a travelling direction such as a right-turn and a left-turn at an intersection etc and further obtaining traffic information from a VICS (Vehicle Information and Communication System) information receiving unit 106 that will be described later on, positional information of the self-vehicle from a GPS (Global Positioning System) information receiving unit 107 and displaying these items of information, and has a configuration including a hard disk (HD) stored with the map information used for the navigation, a CPU which executes a variety of arithmetic processes, a memory such as a RAM (Random Access Memory) stored with the data for the variety of processes, etc, in which a variety of operations of the navigation unit 130 such as the ON/OFF operation are controlled by the control signals given from the control unit 100.

A numeral 106 represents the VICS information receiving unit which receives the traffic information based on the Vehicle Information and Communication System (VICS (registered trademark)) and outputs the received traffic information, and has a configuration including a receiver (FM receiver, a radio wave beacon receiver, an optical beacon receiver) for receiving the data from the VICS, the decoding circuit for decoding the received data and so on. A numeral 107 denotes the GPS information receiving unit which detects the position of the self-vehicle on the basis of GPS signals given from a GPS (registered trademark) satellite and outputs information on the detected present position, and has a configuration including a GPS signal receiving circuit for receiving the GPS signals and an arithmetic unit for calculating the position of the self-vehicle on the basis of the received GPS signals.

A numeral 5 represents the camera which captures the images in the periphery of the vehicle and inputs moving picture data (video information and audio information) via an external audio/video input unit 118 containing the video processing unit 4. The video information of the images captured by the camera 5 is displayed on the display unit 113 via a distribution circuit 108, an image adjusting circuit 109 and an image output unit 112, and is thus utilized for assisting parking etc. Further, the data of the moving picture captured by the camera 5 may be recorded on the HD drive or memory 115 within the HD reproducing unit 105 through the distribution circuit 108 for a drive recorder etc.

Note that a plurality of cameras 5 may be, without being limited to a single piece of camera, provided as the necessity arises. An installation position of the camera 5 is exemplified by positions for capturing a frontward image, a backward image, a sideward image and an oblique backward image (i.e., the blind spot of the driver) and also an inside image of the vehicle. In the case of including the plurality of cameras 5, such configurations may be taken that a one-to-one connection between the camera 5 and the video processing device 10 is established and that one set of video information is selected from the plurality of cameras 5 and is inputted to one video processing device 10.

The external audio/video input unit 118 executes a process such as making a conversion into predetermined video signals in order for the display device 113 to display the video information inputted from the camera 5 and the video processing device 10.

The video processing device 10 detects, as described above, the analysis target such as the characteristic points from the video information of the images captured by the camera 5, and determines the approaching object on the basis of the detected analysis target. Through this operation, the video processing device 10 supports the visual check of the driver in a way that emphatically displays the forward vehicle by detecting that a distance from the forward vehicle is shortened, emphatically displays the two wheeler by detecting this two wheeler approaching from the blind spot, and so on.

Further, the video processing device 10 detects the analysis target such as the characteristic points from the video information of the images captured by the camera 5 and determines the status of the video information on the basis of the thus-detected analysis target. With this operation, for instance, if the proper image information can not be obtained due to the fault of the camera 5, the dirt on the lens of the camera 5, an underexposure, etc, a message purporting that the support described above can not be done is displayed on the display device 113 via the external audio/video input unit 118, and a voice message having the same purport is output from a speaker 111.

A numeral 108 denotes the distribution circuit which outputs the audio signals and the video signals, which are designated to be output by the control signals of the control unit 100, of a variety of sources (the external storage medium reproducing unit 101, the radio receiving unit 102, the TV receiving unit 103, the disk reproducing unit 104, the HD reproducing unit 105 and the video processing unit 4 which processes the video signals of the navigation unit 130 and the camera 5) to the voice adjusting circuit 110 and the image adjusting circuit 109, and has a configuration including a switch group built up by the electronic circuits such as relays and switching transistors.

A numeral 109 represents the image adjusting circuit which adjusts luminance, a color tone and a contrast of the imputed image signal and outputs the adjusted image signal, and has a configuration including a memory stored with the image data, an arithmetic circuit such as a digital signal processor for arithmetically processing the image data, and so on.

A numeral 110 designates an audio adjusting circuit which adjusts a volume and a voice of the inputted audio signal on the basis of the control signals of the control unit 100 and outputs the thus-adjusted audio signal, and has a configuration including a memory stored with the audio data, the arithmetic circuit such as the digital signal processor for arithmetically processing the audio data, an amplification/attenuation circuit and a resonance circuit which are constructed of transistors, resistances, capacitors, coils, etc. A numeral 111 stands for the speaker which audio outputs the audio signal inputted by the audio adjusting circuit 110.

A numeral 112 designates the image output unit which inputs the video signal inputted from the image adjusting circuit 109 and the display image signal to be displayed on the display unit 113 from the control unit 100, executes a process such as synthesizing the images and drives the display unit 113 on the basis of the image signals undergoing this process, and has a configuration including an image ASIC (Application Specific Integrated Circuit) defined as an arithmetic processing circuit specialized for the images, which executes the image processing based on the arithmetic process, a video memory stored with the image data for the image processing and the image outputting, an image drive circuit for driving the display unit 113 on the basis of the image data stored on the image outputting video memory, and so forth.

The display unit 113 includes a touch panel 131, a liquid crystal panel 132 and a backlight 133 (133). The picture is rendered on the liquid crystal panel 132 by use of the video signals given from the image output unit 112 and is illuminated with the light from a rear side by the backlight 133, thereby displaying the picture such as the moving picture. Furthermore, the display unit 113 displays an operation menu etc on the liquid crystal panel 132, then a user's operation of making a selection by touching this operation menu is detected on the touch panel 131 superposed on the liquid crystal panel 132, and the detected operation signal is inputted to the control unit 100.

Note that the display unit 113 can involve using, other than the liquid crystal panel, a flat panel display such as an organic EL display panel, a plasma display panel and a cold cathode flat panel display.

A numeral 114 represents an operation unit used for the user of the device to perform the variety of operations, and has a configuration including, e.g., a push button switch, a rotary manipulation type switch, a joystick, etc. A numeral 115 designates a memory (storage medium) stored with the various categories of data and a control program, and has a configuration including e.g., the HDD (Hard Disk Drive), a rewritable flash memory, etc.

A numeral 116 denotes a remote control unit (remote controller) which is installed in a place distanced from the AVN integrated machine body installed in an installment panel etc in the automobile, e.g., installed in the vicinity of an armrest between a driver's seat and a passenger seat or at a steering wheel and outputs an operation status of the input operation of the user, in which a rotary operation, a tilt operation and a push operation of the operation unit are detected in this example. Note that this type of remote control unit has a configuration including a rotary encoder which outputs signals corresponding to a quantity and a direction of the rotary operation, a tilt sensor such as the joystick which is built up by a pressure-sensitive sensor and outputs a signal corresponding to a direction of the tilt operation, and a pressing switch of which an ON/OFF status changes corresponding to the pressing operation. The operation signal detected by the remote controller 116 is transmitted to a remote controller transmitting/receiving unit 117 and then inputted to the control unit 100.

A numeral 120 designates an ETC on-board device which automatically pays a toll by performing communications with a terminal on the side of an ETC lane in an ETC (registered trademark: Electronic Toll Collection) system.

What is claimed is:

1. A video processing device to process video information of an image capturing device mounted on a moving body, comprising:
    an analysis target detection unit to detect an analysis target from video information of images captured by the image capturing device;
    a status determining unit to determine a status of the video information on the basis of information on the analysis target detected by the analysis target detection unit; and
    an output control unit to output a result of the determination, wherein
    the analysis target detection unit includes
        a characteristic point detection unit that detects characteristic points from the video information inputted by the image capturing device, and
        a characteristic point observation unit that calculates a fluctuation in position of the detected characteristic point between different frames, and
    the status determining unit determines that it is in an abnormal state when the detected characteristic points are detected by the characteristic point detection unit, and the number of characteristic points not continuously detected between different frames by the characteristic point observation unit is equal to or greater than a threshold value.

2. The video processing device according to claim 1, wherein the abnormal state is a state in which the image capturing device gets into a fault or a state in which illuminance is low.

3. The video processing device according to claim 1, wherein when the characteristic point observation unit detects: (1) that a characteristic point does not change in a given area of a lens of the image capturing device while a characteristic point changes in the remaining area of the lens; or (2) that a characteristic point is not detected in the given area while a characteristic point is detected in the remaining areas of the lens, the status determining unit determines that dirt is attached to the lens of the image capturing device.

4. The video processing device according to claim 1, wherein when the characteristic point observation unit detects that the characteristic points have no movement, the status determining unit determines that the image capturing device gets into a fault.

5. The video processing device according to claim 4, wherein when detecting based on speed information of the moving body that the moving body travels at a predetermined speed or higher and when the characteristic point observation unit detects that the characteristic points have no movement corresponding to the movement of the analysis target, the status determining unit determines that the image capturing device gets into the fault.

6. A video processing method to process video information of an image capturing device mounted on a moving body, by which a computer executes:
    detecting an analysis target from video information of images captured by the image capturing device;
    determining a status of the video information on the basis of information on the analysis target; and
    outputting a result of the determination, wherein
    the detecting of an analysis target includes detecting characteristic points from the video information inputted by the image capturing device and calculating a fluctuation in position of the detected characteristic point between different frames, and
    the outputting the result of the determination includes determining that it is in an abnormal state when the characteristic points are detected, and the number of characteristic points not continuously detected between different frames is equal to or greater than a threshold value.

7. A non-transitory, computer readable recording medium storing a video processing program to process video information of an image capturing device mounted on a moving body, the program making a computer execute:
    detecting an analysis target from video information of images captured by the image capturing device;
    determining a status of the video information on the basis of information on the analysis target; and
    outputting a result of the determination, wherein
    the detecting of an analysis target includes detecting characteristic points from the video information inputted by the image capturing device and calculating a fluctuation in position of the detected characteristic point between different frames, and
    the outputting the result of the determination includes determining that it is in an abnormal state when the characteristic points are detected, and the number of characteristic points not continuously detected between different frames is equal to or greater than a threshold value.

* * * * *